I. F. PECK.
TIRE.
APPLICATION FILED MAR. 24, 1908.

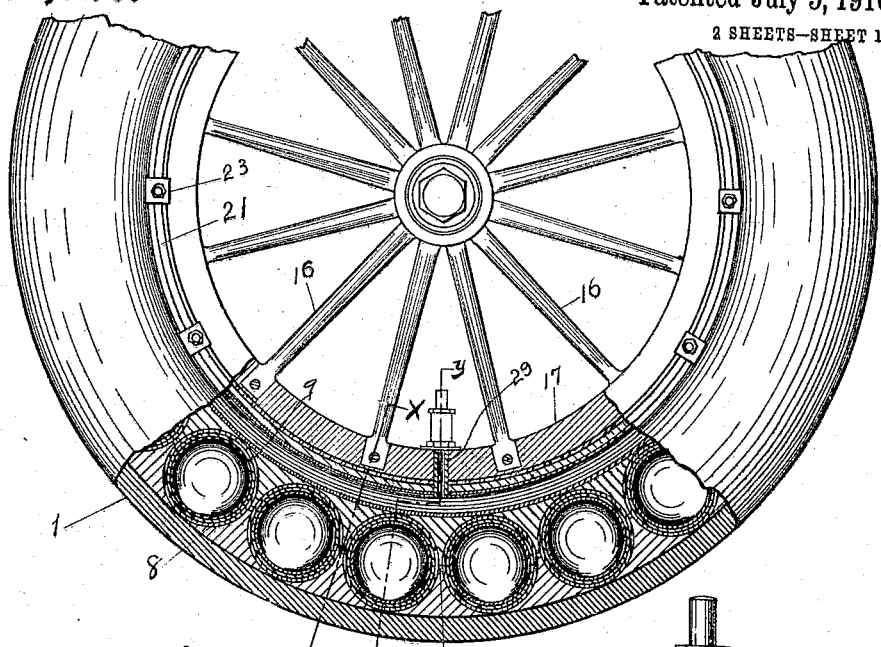
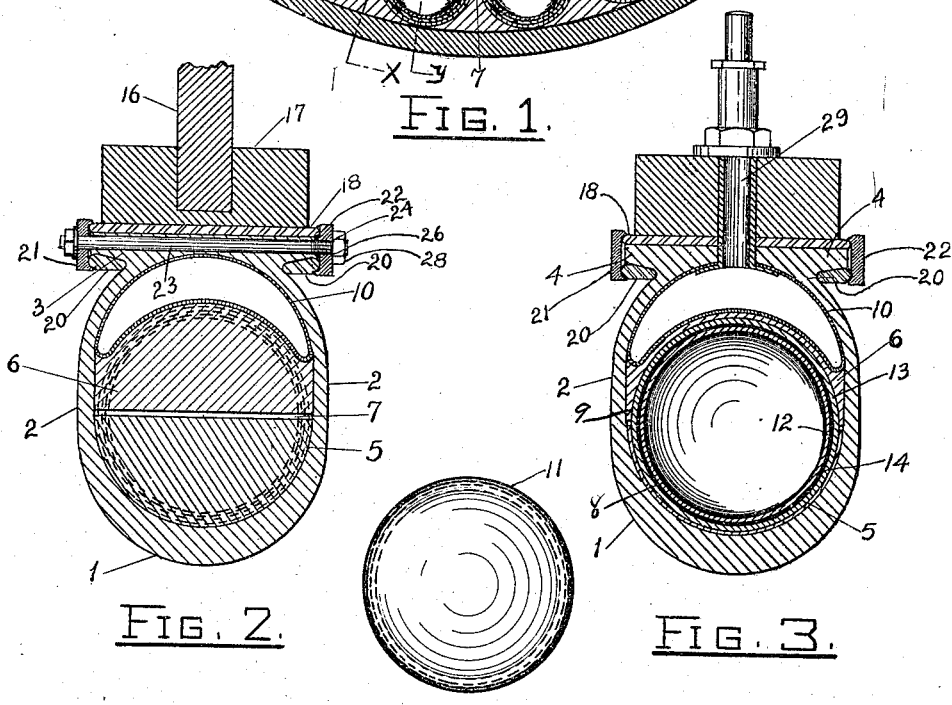

963,320.

Patented July 5, 1910.
2 SHEETS—SHEET 2.

WITNESSES:
Joseph E. Burns,
William E. Tefft.

INVENTOR.
Ira F. Peck
BY
Horatio E. Bellows
ATTORNEY.

UNITED STATES PATENT OFFICE.

IRA F. PECK, OF CRANSTON, RHODE ISLAND.

TIRE.

963,320.  Specification of Letters Patent.  Patented July 5, 1910.

Application filed March 24, 1908. Serial No. 422,893.

*To all whom it may concern:*

Be it known that I, IRA F. PECK, a citizen of the United States, residing at Cranston, in the county of Providence and State of Rhode Island, have invented certain new and useful Improvements in Tires, of which the following is a specification.

My invention relates to tires adapted for use upon vehicles of all kinds, and has for its primary objects strength and resiliency; adaptability of its constituent parts to assemblage or removal; prevention or localization of collapse; protection against fracture or rending by punctures or blow-outs;
avoidance of rim cutting; and adaptability to use in conjunction with any form of casing, or as a substitute for a pneumatic tube of any kind.

Further objects of my invention will appear from an examination of the drawings and the following description and claims.

To the above ends essentially my invention consists in locating interspaced inflated balls within two substantially solid tire sections; in removably seating the balls; in employing a flexible tube in conjunction with the balls; in making the ball walls self-sealing or occlusive.

The invention consists further and finally in the features, combinations, and details of construction hereinafter described and claimed.

Figure 5:
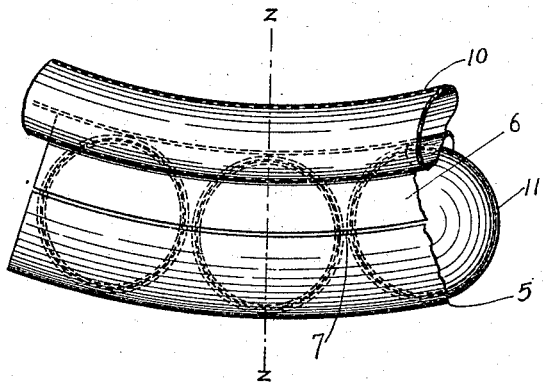
Figure 6:
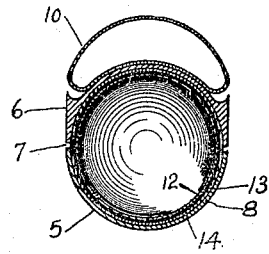
Figure 8:
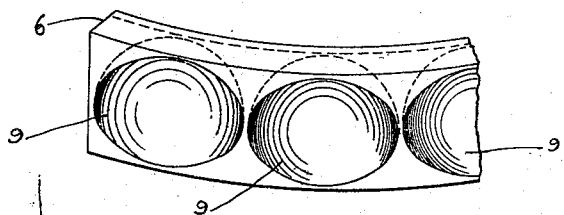
Figure 7:
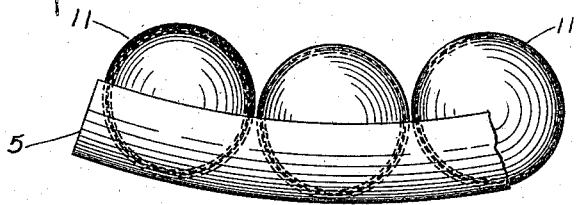

In the drawings which constitute a part of this specification, and wherein like reference characters indicate like parts throughout the views, Figure 1 is a side elevation, partially in central longitudinal section, of a wheel equipped with a tire embodying my invention. Figs. 2 and 3, transverse sections of the same on lines *x x* and *y y* respectively of Fig. 1. Fig. 4, a detail view of one of the balls. Fig. 5, a perspective view of a section of the tire broken away. Fig. 6, a transverse section of the same on line *z z* of Fig. 5. Fig. 7, a side elevation of a portion of the outer ball seating member, with balls located therein, and Fig. 8, a perspective view of a portion of the inner seating member tilted away from the balls.
A convenient form of embodiment of my invention consists of an outer casing comprising a tread portion, 1, and side walls, 2, whose free ends constitute a base, 3, provided with external longitudinal beads or shoulders, 4. The casing, however, may be of any construction suitable for retaining or binding the novel parts now to be described.

The tire body comprises two elastic longitudinal sections or strips 5 and 6, of solid rubber, each substantially semi-circular in cross section, and having their adjacent plane surfaces preferably slightly interspaced as at 7. At regular intervals the outer strip or body member, 5, is provided upon its flat or plane surface with a series of interspaced curved or substantially hemispherical cavities or pockets, 8. The flat side of the member, 6, also is provided with similar pockets, 9, in transverse alinement with the pockets, 8. Resting against the inner or curved exterior of the member, 6, is an independent longitudinally disposed inflated tube, 10, composed of rubber, fabric, or other flexible material, and substantially crescent shaped in cross section. Hollow inflated balls, 11, are provided which may be of any flexible or resilient material; but the preferred structure is as follows: The ball wall comprises an inner and outer ply or layer of rubber, 12, and 13, respectively, with an intermediate layer or lining, 14, of occlusive or self-sealing rubber. The corresponding cavities 8 and 9 combine to form a substantially spherical receptacle or seat for a ball, 11, which is held tightly against any rotation or other abrasive movement in its seat by the transverse compression of the body members, 5 and 6, which is rendered more effective by the space or clearance, 7.

The tire casing may be attached to the wheel in any usual manner. A convenient means is that shown wherein 16 are the spokes, 17 the felly, and 18 the metal rim, of an ordinary wheel, against which the base, 3, of the tire case rests. Upon the sides of the shoulders, 4, opposite the rim rest retaining rings, 20; and upon the extremities of the shoulders, embracing both the rim and retaining rings, are clamping rings, 21, and 22. The clamping rings are connected at intervals by pins or bolts, 23, each provided with threads, 24, and passing through an opening 26 in the ring 22. Upon the threaded end of the bolt, which also passes transversely through the tire base, is a nut, 28. For the purpose of inflation, the tube, 10, is provided with the air valve, 29.

It will be understood that the inflated member, 11, styled "balls" herein, may be of any desired cross sectional contour.

What I claim is,

1. In a tire, the combination of two longitudinally disposed solid body sections, each provided with a series of cavities upon their adjacent faces, a series of inflated members registering in the cavities of both sections, an inflated tube resting upon one of the sections, and a casing inclosing the tube and sections.

2. In a tire, the combination of two longitudinally disposed solid body sections, each semi-circular in cross section and having their flat faces adjacent and interspaced from each other, and each section provided with a series of concave cavities upon their flat faces, a series of inflated members registering in the cavities of both sections, an inflated tube substantially crescent shaped in cross section resting upon the curved surface of one of the sections, and a casing inclosing the tube, and sections.

3. In a tire, the combination of two longitudinally disposed solid body sections each provided with a series of cavities, inflated members registering in the cavities of both sections, each ball comprising layers of flexible material and an intermediate layer of occlusive rubber, and a casing surrounding the sections.

In testimony whereof I have affixed my signature in presence of two witnesses.

IRA F. PECK.

Witnesses:
  HORATIO E. BELLOWS,
  JOSEPH E. BURNS.